UNITED STATES PATENT OFFICE.

ROBERT GNEHM, OF BASLE, SWITZERLAND, ASSIGNOR TO THE SOCIETY OF CHEMICAL INDUSTRY OF BASLE, OF SAME PLACE.

RED CARBON COLOR.

SPECIFICATION forming part of Letters Patent No. 402,436, dated April 30, 1889.

Application filed September 24, 1888. Serial No. 286,245. (No specimens.)

*To all whom it may concern:*

Be it known that I, ROBERT GNEHM, a citizen of Switzerland, residing at Basle, Switzerland, have invented new and useful Improvements in the Production of a Coloring-Matter by the Action of Succinic Acid upon Diethylmetaamidophenol, of which the following is a specification.

This invention relates to the production of a coloring-matter suitable for dyeing and printing by the action of succinic acid upon diethylmetaamidophenol.

In carrying out my invention I proceed as follows: Thirty grams of diethylmetaamidophenol, fifty grams of succinic acid, and twenty grams of chloride of zinc are heated together during a quarter of an hour at 205° centigrade, or during one to two hours at 195° centigrade. The liquid melt is again heated with one kilogram of water on the water-bath until it is completely dissolved. Then it is precipitated by means of about one hundred and fifty grams of common salt, and when cold the mother-lye is decanted. After boiling again with one kilogram of water and twenty grams of sal-ammoniac, the coloring-matter is precipitated with one hundred and fifty grams of common salt. Then I decant again, and dissolve the semi-fluid residue in ten grams of muriatic acid and one kilogram of water, and evaporate the filtered solution to dryness.

The coloring-matter represents a brownish-red, very hygroscopic, powder, which is soluble in water and alcohol. The alcoholic solution shows a decidedly yellow fluorescence. It dyes on wool and mordanted cotton a brilliant red with yellow fluorescence.

What I claim as new, and desire to secure by Letters Patent, is—

The red coloring-matter obtained from succinic acid and diethylmetaamidophenol, forming a hygroscopic powder soluble in water and alcohol, and dyeing wool, silk, and mordanted cotton a brilliant red with yellow fluorescence.

In testimony whereof I have hereunto set my hand in the presence of two subscribing witnesses.

ROBERT GNEHM.

Witnesses:
GEORGE GIFFORD,
N. HENZI.